US009742766B2

United States Patent
Bhatnagar

(10) Patent No.: US 9,742,766 B2
(45) Date of Patent: *Aug. 22, 2017

(54) SYSTEM, DESIGN AND PROCESS FOR EASY TO USE CREDENTIALS MANAGEMENT FOR ACCESSING ONLINE PORTALS USING OUT-OF-BAND AUTHENTICATION

(71) Applicant: Piyush Bhatnagar, Morganville, NJ (US)

(72) Inventor: Piyush Bhatnagar, Morganville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/192,622

(22) Filed: Jun. 24, 2016

(65) Prior Publication Data
US 2016/0308678 A1 Oct. 20, 2016

Related U.S. Application Data

(63) Continuation-in-part of application No. 14/143,659, filed on Dec. 30, 2013, now Pat. No. 9,412,283.
(Continued)

(51) Int. Cl.
*H04L 29/06* (2006.01)
*G09C 5/00* (2006.01)
*H04L 9/32* (2006.01)

(52) U.S. Cl.
CPC ............ *H04L 63/0876* (2013.01); *G09C 5/00* (2013.01); *H04L 9/3215* (2013.01);
(Continued)

(58) Field of Classification Search
CPC ... H04L 9/3215; H04L 9/3228; H04L 9/3218; H04L 63/0853; H04L 63/083;
(Continued)

(56) References Cited

U.S. PATENT DOCUMENTS

| 8,256,664 B1* | 9/2012 | Balfanz | G06F 21/43 235/375 |
| 2013/0145446 A1* | 6/2013 | Dorso | G06F 21/43 726/6 |

(Continued)

*Primary Examiner* — Izunna Okeke
*Assistant Examiner* — Hee Song
(74) *Attorney, Agent, or Firm* — Douglas C. Wyatt

(57) ABSTRACT

The invention provides an easy to use credential management mechanism for multi-factor out-of-band multi-channel authentication process to protect user access to online portals. When opened, the client processing application generates a multi-dimensional code. The user scans the multi-dimensional code and validates the client processing application and triggers an out-of-band outbound mechanism. The portable mobile device invokes the authentication server to get authenticated. The authentication server authenticates the user based on shared secret key and is automatically allowed access to the online portal. The process of the invention includes an authentication server, a client processing application to generate an authentication vehicle or an embodiment (i.e. multi-dimensional bar code) and handle incoming requests, secret keys and a portable communication device with a smartphone application.

10 Claims, 7 Drawing Sheets

Related U.S. Application Data

(60) Provisional application No. 61/747,517, filed on Dec. 31, 2012.

(52) U.S. Cl.
CPC .......... *H04L 9/3228* (2013.01); *H04L 63/062* (2013.01); *H04L 63/083* (2013.01); *H04L 63/0853* (2013.01); *H04L 63/18* (2013.01); *H04L 2209/56* (2013.01); *H04L 2209/80* (2013.01)

(58) Field of Classification Search
CPC ... H04L 63/0875; H04L 63/18; H04L 63/062; G09C 5/00
See application file for complete search history.

(56) References Cited

U.S. PATENT DOCUMENTS

| | | | | |
|---|---|---|---|---|
| 2013/0167208 A1* | 6/2013 | Shi | ................... | H04L 63/18 726/5 |
| 2013/0173915 A1* | 7/2013 | Haulund | ............... | H04L 9/3226 713/159 |
| 2014/0096220 A1* | 4/2014 | Da Cruz Pinto | ....... | G06F 21/00 726/9 |

* cited by examiner

SYSTEM, DESIGN AND PROCESS FOR EASY TO USE CREDENTIALS MANAGEMENT FOR ACCESSING ONLINE PORTALS USING OUT-OF-BAND AUTHENTICATION

PRIORITY

This application is a continuation-in-part of co-pending U.S. patent application Ser. No. 14/143,659 filed on Dec. 30, 2013, which claims priority to U.S. Provisional Application Ser. No. 61/747,517 dated Dec. 31, 2012, the contents of which are ail relied upon and incorporated herein by reference.

INCORPORATION BY REFERENCE

Applicant incorporates by reference herein United States publication no. 2012-0240204-A1, entitled "System, Design and Process for Strong Authentication using Bidirectional OTP and Out-of-Band Multichannel Authentication."

FIELD OF THE INVENTION

The field of invention relates to network and Internet security. The present invention relates to an authentication system and authentication method and in particular to a process and design for a multi-factor, out-of-band multi-channel authentication process to protect access to online accounts.

BACKGROUND OF THE INVENTION

Authentication of a user and their credentials is the first line of defense. User authentication involves confirming the identity of a user and validating that a user is trusted and can use a computer resource based on their credentials. Most people protect their online accounts using some form of passwords. On an average a typical user has about 20 accounts for which they need to remember passwords. Most users utilize the same password for most accounts just to make it easier to remember. This practice makes all accounts vulnerable and makes it easier for a hacker to break into all other accounts if one of the accounts is compromised.

IDs can be lost or stolen during transactions (whether its login, payment, or other transactions), IDs must be presented in many places explicitly. For example, in the process of electronic payment, ones credit card details must be presented to a counter party. Although IDs in a transaction may be encrypted, there are still many possibilities in which IDs can be lost or stolen.

Static or fixed password is a common form of authentication method in use today.

In the static password authentication method, the user enters static user id and password on a client site and submits. Then the request is sent to the authentication server to validate the credentials of the user. If the credentials are valid the user is traversed to the next page.

With static password, keeping the accounts secure and hack proof is a difficult task. To keep their accounts from being compromised, the user must select long and difficult to predict passwords. Most users use some of their personal information to create their password thus making it easier to remember. In addition, users have a tendency to use the same password for most of their accounts as remembering multiple passwords can be quite a challenge.

Different random generators or OTP platforms use the in band authentication mechanism this leads to hacker being in the same environment as the authentication mechanism.

Multi-factor authentication exists and is prevalently used in enterprises, as these techniques are more secure. Using multi-factor authentication for anything other than enterprise environment is still a huge adoption and usability challenge. A common user today accesses number of sites and has multiple online accounts. A user today will access one or more private emails servers, access his/her online banks, make purchases using various online stores and check personalized news. For each of these activities, the user will have to login to their service providers to access these services. None of these services use multi factor authentication today and depend on static passwords. The primary reason is due to the complexity of deployment and cumbersome usage of Multi Factor authentication today.

An object of the present invention is to address the problem of the related art technique and to provide an authentication system and authentication method which permit improvement in the security of the authentication system while making it easier to use. The invention utilizes bi-directional multi-channel authentication. One embodiment is based on multi-dimensional QR Code which provides a vehicle for strong authentication, ease of use, minimal switching cost and lower total cost of ownership. By utilizing the multi-dimension bar code solution improves usability and eliminates key security issues.

SUMMARY OF THE INVENTION

The instant invention provides an easy to use authentication and credential management mechanism for multi-factor out-of-band multi-channel authentication process to protect all user access to online portals without involving the account provider. This invention provides a strong multi-factor authentication and transaction mechanism for end users/consumers to protect their user identities and accounts and provide seamless usability. This system gives access to authentication seekers based on an out-of-band authentication mechanism. The authentication seeker or system user scans the multi-dimensional barcode or via other embodiments and validates the client and triggers the out-of-band outbound mechanism. The portable mobile device invokes the client server to get authenticated. The client server authenticates the user based on shared secret key and is automatically traversed to the next page. This invention protects the users from Key logger, Dictionary attacks, Man-in-the Browser (MITB), Replay attacks, and Phishing attacks. The process of the invention includes an: authentication server, a browser extension to generate an authentication vehicle or an embodiment (i.e. multi-dimensional barcode) and handle incoming requests, secret keys and a portable communication device with a smartphone app.

A preferred embodiment of the present invention utilizes a client/server system, which comprises an authentication server, a client processing application, a portable communications device application, and a user hand held mobile device equipped with a camera or reader and an online authentication client, all of which are connected via a network. The browser extension and the authentication server achieve mutual secure connection based on secure sockets layer (SSL). The handheld device is also connected to the network and can connect to the authentication server in a secure manner using SSL.

In an embodiment, a user who wants to login to an online portal (like Gmail, or Yahoo) using this invention opens a login portal on the client processing application, which has programming for communication between the login portal and screen. The client processing application and the authentication server establishes contact in which a new authentication session is started and a session ID is generated.

The client processing application detects that the login portal requires user credentials and shows an icon on the screen. The user clicks on the icon and the client processing application generates a multi-dimensional dynamic barcode based on online portal, client/server information (including but not limited to the IP-address of the client machine and the URL of the destination login portal), a dynamically generated encryption key, portal information, and a unique session ID. The barcode is displayed at the login screen and the client processing application is put on hold pending notification of session validation from the authentication server.

The user starts the portable communications device application. The user provides its authentication information, such as a PIN or Gesture and/or additional biometric signature like face match, voice print match, etc. The portable communications device then establishes an independent secure connection over carrier network wireless connection or Wi-Fi connection to the authentication server using SSL. The portable communications device validates the user PIN/Gesture as well as the biometric profile with the authentication server and displays a scan option. Using the portable communications device, the user scans the barcode displayed at the login screen. The client processing application finds at least one encrypted user credential with the encryption key from the barcode and sends the encrypted credentials with, the session ID to the authentication server via an outbound out-of-band communications channel.

The authentication server checks in the provisioned user database, validates the session, and sends the encrypted payload to the client processing application. The portable communications device application decrypts/decodes the barcode and ensures the validity of the online portal. This unique client validation mechanism ensures there are no phishing attacks.

Once the validity of the client processing application is ensured, the portable communications device application takes the extracted data from the bar code, looks up in a secure credentials database for the login portal by extracting information from the login portal URL. If the credentials for that online portal are not found in the secure credentials database, the hand held device portable communications device application presents a screen to the user to provide the credentials for that login portal. Once the user provides the credentials, the authentication client processing application saves the credentials on the secure credentials database on the hand held device for future use.

The portable communications device application on the hand held device then sends user credentials for the login portal along with the unique session ID to the authentication server directly using this secure out-of-band channel. If the authentication server finds the user and the session ID valid it contacts the waiting client processing application using the session ID and passes the user credentials as well as user roles/privileges. Based on the user roles/privileges, the online service server can automatically provide specified access to the allowed service components that the user has been authorized for.

In this embodiment, the user experience is simplified and can only require the user scanning the barcode presented on the login screen. From users' perspective, once the scanning of barcode is done, if user is valid, the login proceeds to the next screen based on the user rights.

It is to be understood that both the foregoing description and the following description are exemplary and explanatory only and are not restrictive of the invention, as claimed. Specific examples are included in the following description for purposes of clarity, but various details can be changed within the scope of the present invention.

BRIEF DESCRIPTION OF THE DRAWING

A preferred embodiment of the invention has been chosen for detailed description to enable those having ordinary skill in the art to which the invention appertains to readily understand how to construct and use the invention and is shown in the accompanying drawing in which.

DETAILED DESCRIPTION OF THE INVENTION

Figure 1:
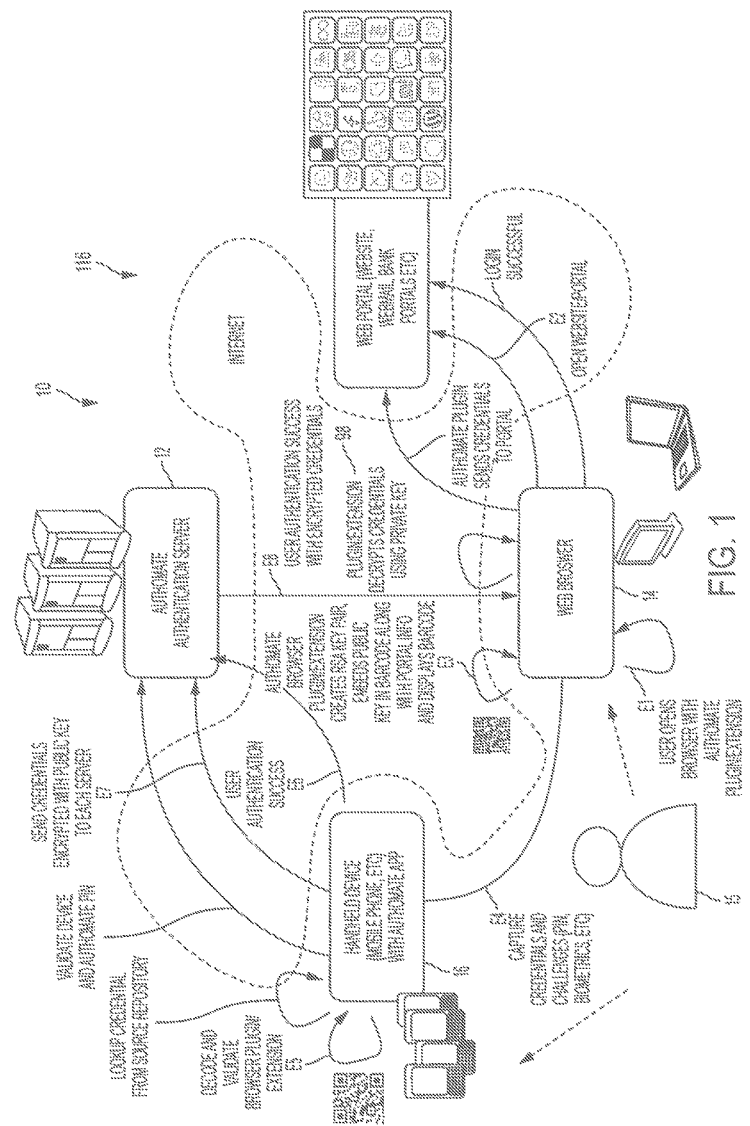
FIG. 1 is a block diagram describing the various components of an embodiment invention and depicting an example of an out-of-band outbound multi-channel authentication.

Referring to the drawing, FIG. 1 illustrates a preferred embodiment of system and process according to the invention. In particular, FIG. 1 shows an authentication system 10 that utilizes out-of-band outbound multi-channel authentication using a client/server system comprising an authentication server 12, browser having client processing 14, such as plug-ins or extensions, and a user hand held mobile device 16 equipped with a camera and with portable communications device application, all of which are connected via a communications network 116 to access an online account server.

The browser plug-in and the authentication server achieve mutual secure connection based on SSL. The handheld device is also connected to the network and can connect to the authentication server in a secure manner using SSL.

Figure 6:
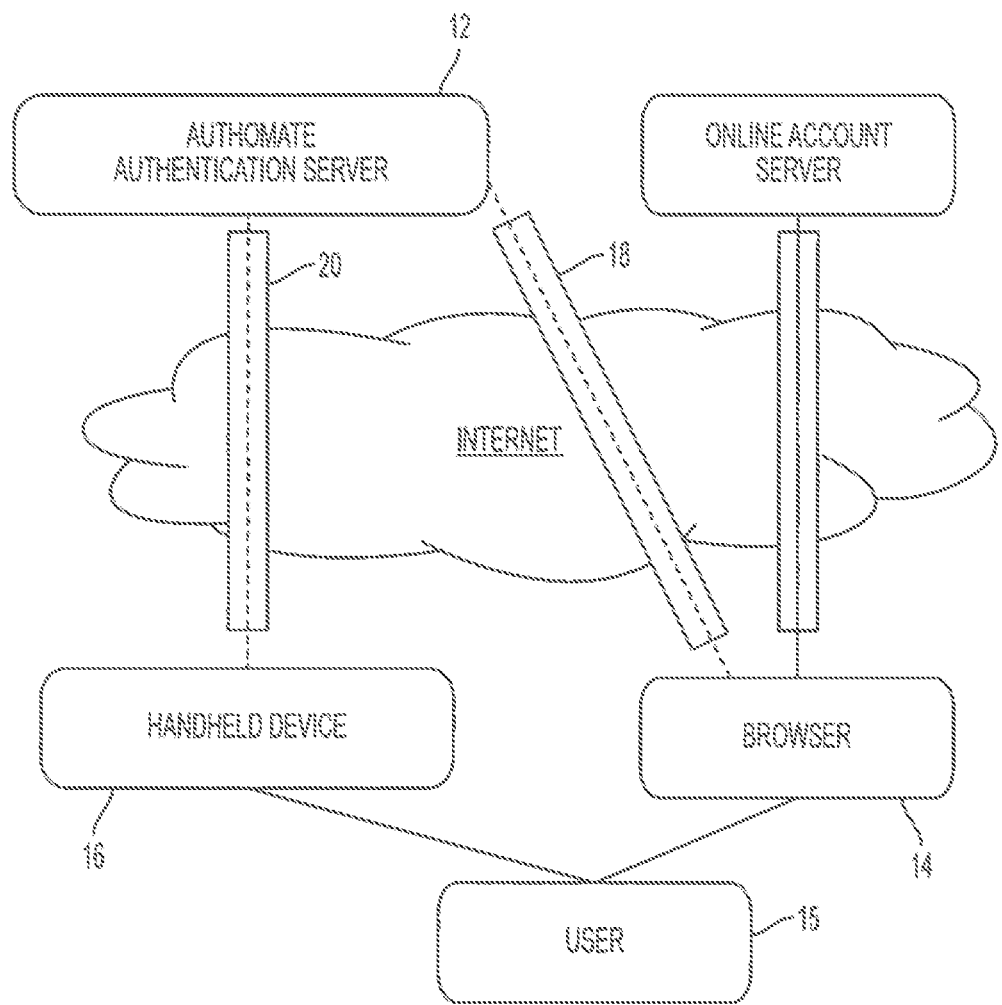
FIG. 6 is a block diagram illustrating one example of two separate communication channels in an embodiment of the present invention.

FIG. 6 illustrates one example of the two separate communication channels in present invention that are used for authentication process. The handheld device 16 communicates with the authentication server 12 over a first communications channel 18 which is separate from a second communications channel 20 over which the browser having the client processing application 14 and authentication server 12 communicate. In one embodiment of a system and process according to the invention, at least the out-bound portions of communications from the handheld device to the authentication server are provided in a separate communications channel 18 and are out-of-band from the communication channel 20 over which the authentication server 12 and client processing application 14 communicate.

The authentication server 12 compares the user information and the third party server credentials to a database of user information and a database of third party server credentials. The authentication server 12 authenticates the user information and the third party server credentials to obtain authentication results. The authentication server 12 transmits E1 the authentication results to the client processing application 14 and can also transmit E2 the authentication results to the portable communications device 16. The client processing application 14 also transmits E3 the authentication results to the hand held device 16. If the authentication results are positive, a secure communication may be established between the user and the client processing application 14, and the user 15 may be granted access by the client processing application 14. Alternatively, if the authentication results are negative, the user is denied further access to the client processing application 14.

Figure 2:
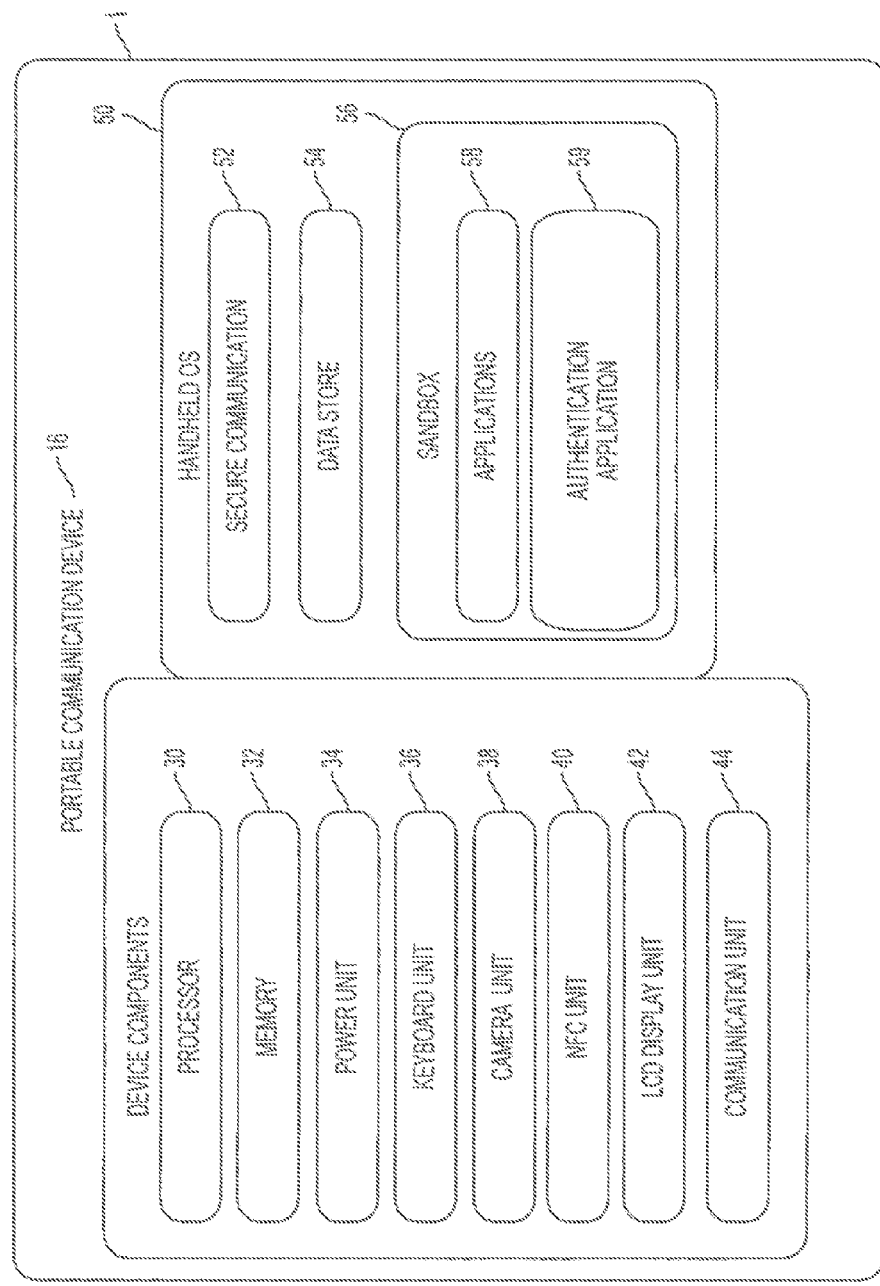
FIG. 2 is a schematic block diagram of an embodiment of a handheld portable communication device.

FIG. 2 illustrates the components of an embodiment of a portable communication device 16 according to the invention, such as a handheld device like a mobile phone or an iPad. The portable communications device can include various components, including a processor 30, memory 32, power unit 34, keyboard 36, camera 38, a near field communication ("NFC") unit 40, LCD Display 42 and a communications unit 44. The device also has an operating system 50 which includes programming for the processes utilized by the device, including programming for secure communication 52, a data storage 54 as well as a sandbox 56, containing an authentication application 58 and other supplemental applications 59 to supplement the processes of the authentication application 58. The sandbox provides a security mechanism for separating running programs and thereby enhances the security of a device according to the invention. Incorporation of an NFC unit 40 in a device according to the invention facilitates use of a device according to the invention by a user in a manner which can make the underlying processes appear seamless. It can be appreciated by a person of ordinary skill in the art to use known processes for the device including processes for providing secure communication 50 by the device 16 to provide for secure receipt and transmission of information. Other applications 59 include software (and there may be hardware capabilities/applications/libraries on the phone) that provide capabilities like picture taking and touch sensitive activity detection.

Figure 3:
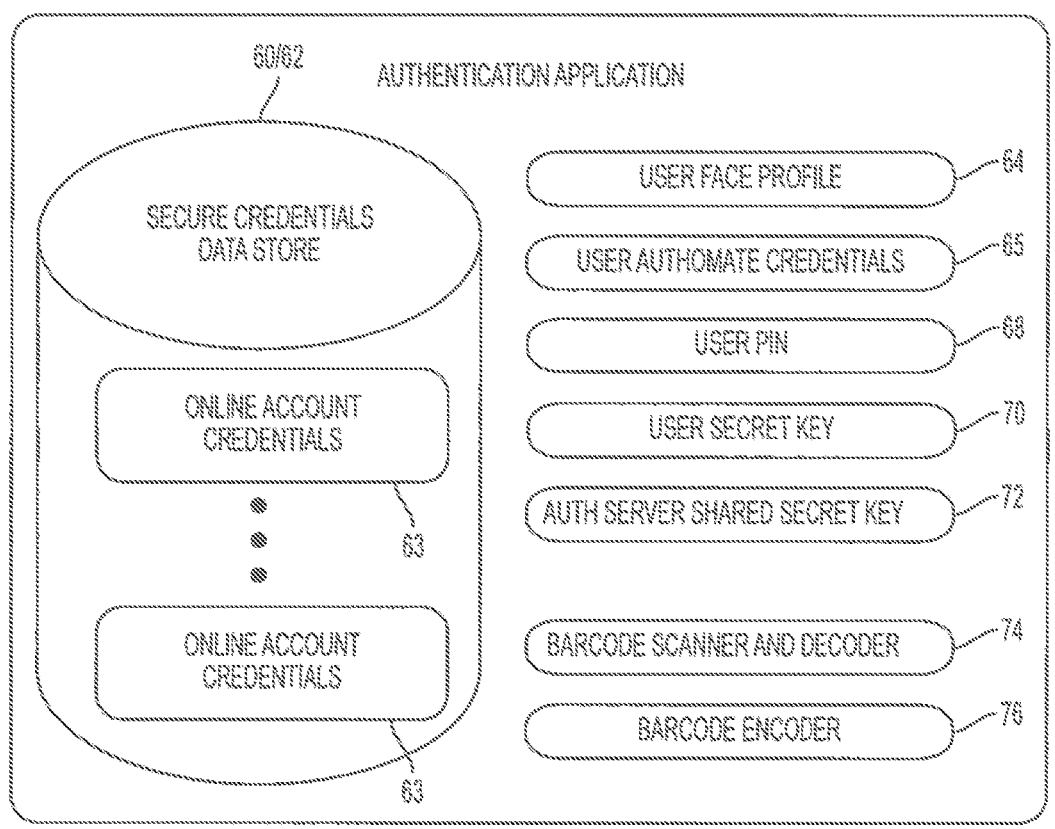
FIG. 3 is a schematic block diagram of embodiment of a portable communication device application in accordance with the invention that may reside in the handheld portable communication device described in FIG. 2.

FIG. 3 illustrates an embodiment of an authentication application having processes that may reside in the handheld portable communication device described in FIG. 2. It can be appreciated by a person of ordinary skill in the art that various programming can be provided to effect the processes of a device 16 according to the invention. The processes can be programmed into one or more separately discrete units. Among other things, a secure data storage 60 process can be provided to effect secure storage and retrieval of information from memory 32 on the device 16. Among other things the secure data storage 62 and credentials 63 can include one or more shared secret keys associated with one or more client processing applications 14. In addition, a user face profile 64 can be provided for a face profile for use with the processes performed by the device 16. The authentication application 14 can also include separate processes for managing and storing other information, such as user credentials 66, a user pin 68, user secret key 70, and an authentication server shared secret key 72 which can be stored in the secure data storage 62 or in other portions of the memory 62. Furthermore, the device 16 includes processes for a barcode scanner and decoder 74 and a barcode encoder 76, which processes can be provided separately or as part of the authentication application 58 process software. The components and arrangements of FIGS. 2 and 3 may be varied within the principles of the present application.

Figure 4:
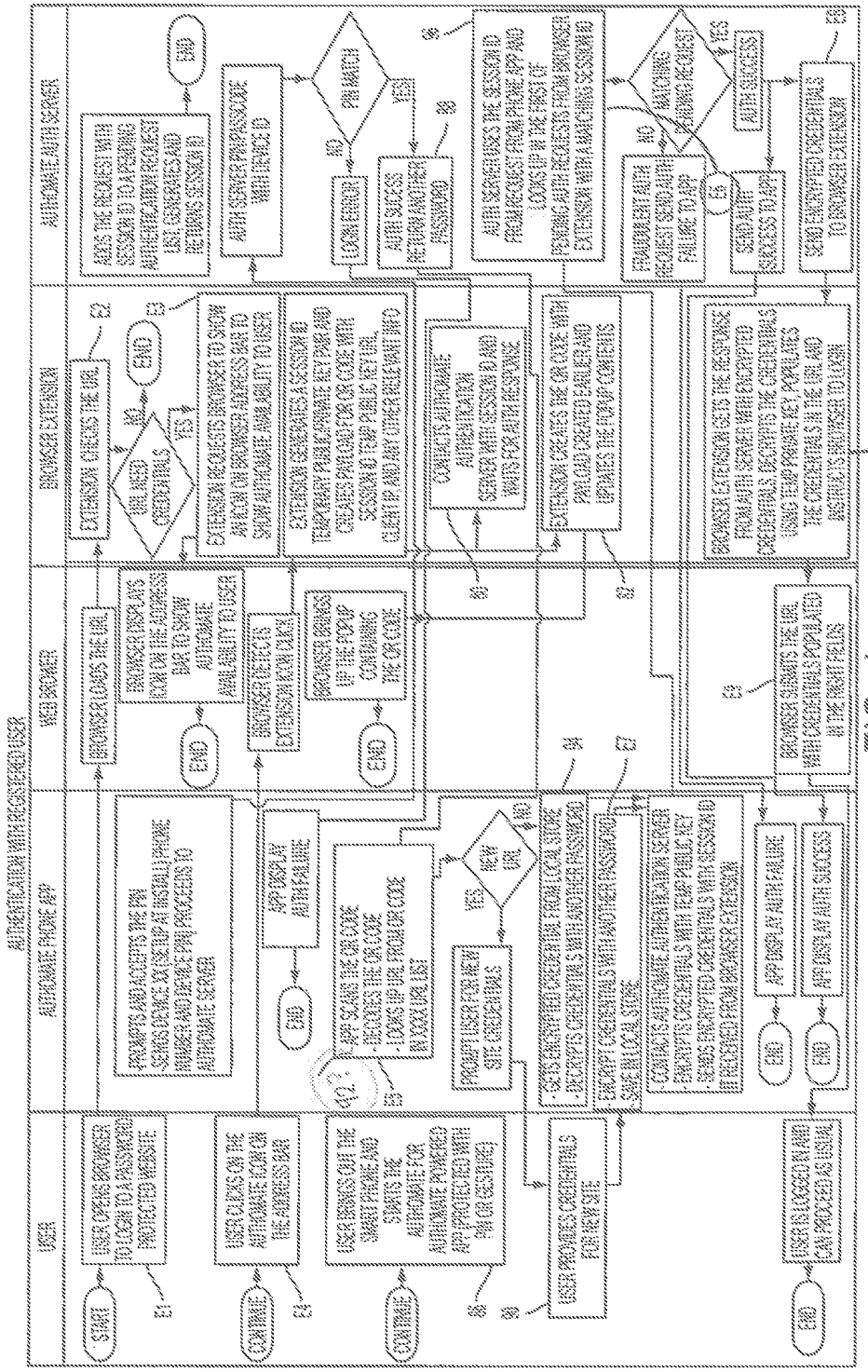
FIG. 4 is a sequence diagram describing the authentication flow based on an embodiment of a method and/or process based on the invention.

Referring to FIGS. 1 and 4, client user starts E1 a client processing application 14 with laptop or PC, which can be automatically started once a user desires to login to an associated online account or portal. For example, the user can open a browser to log in to a password-protected website. Thereafter, the browser can load the URL.

The client processing 14 checks the URL E2 to determine whether or not the associated website requires credentials. The client processing 14 can do this by checking a secure database. If the website requires credentials, the client processing extension can request the browser to show an icon on the browser address bar to show availability of the instant invention to provide secure connection and the needed credentials. In this embodiment, the browser displays the icon, and if the user clicks on the icon the browser detects the extension icon selection to proceed and the browser extension and/or client processing 14 generates a session ID, a temporary public/private key pair and creates a payload for a QR Code with the session ID, temporary public key URL, client IP, and any other relevant information. Thereafter the browser client processing 14 contacts E2 the authorization server 12 to start a new authorization session and the server generates a session ID 80 sent E3 to the client processing application. The client processing application 14 creates 82 a multi-dimensional barcode with dynamic encryption keys, server portal information, session and a unique key and displays the barcode in a popup. The client processing application waits for notification.

Further, or in the alternative, the client extension processing 14 can create the QR code with the payload created earlier and updates the pop-up contents. Thereafter the browser can bring up a pop-up containing a QR code for the user to scan.

In addition to or in the alternative, the client processing application 14 and/or browser extension contacts the authentication server with the session ID, and the authentication server can add the session ID to a list of pending authentication requests.

In addition, or as an alternate, the client processing application 14 creates an RSA key and embeds public key in bar code along with portal information, and displays barcode on laptop or PC screen.

User starts authentication 86 by using a smart phone and starting the portable communications device application 59, or automate power application and entering E4 PIN or gesture on handheld device 16 to access the application. The alternate phone application prompts and accepts the PIN and then sends the device ID (which can be set up upon initialization of services), phone number and device ID/passcode to the authentication server 12.

Authentication server 12 receives the PIN/passcode with the device ID and checks against a secure database for a match for the device to login to the authentication server. If the match is successful, the authentication server returns notification and/or a password to the handheld device application 59 indicating success, and accordingly completes a process which validates PIN and can alternatively, or in addition display one or more scan options 88.

User holds 90 handheld device to laptop or PC login screen and clicks scan option E5. Device scans barcode and validates the client processing application 92. On notification E6, the handheld device 16 finds 94 the encrypted user credentials with encryption key from barcode and sends E7 the encrypted credentials and session ID to authentication server 12. Authentication server 12 checks 96 in provisioned user database, validates session, and sends E8 encrypted payload to waiting client processing application 14. The client processing application decrypts 98 payload using the keys it generated and extracts the credentials. The client processing application 14 then uses the decrypted credentials to provide access to login to the online account and/or web portal and proceed to use those services of the online account.

Handheld device 16 displays result received E9 from the authentication server.

The out-of-band outbound mechanism provides an additional level of security due to the original request being different than the outgoing push from the portable device to the service provider server.

The usability issue is addressed by utilizing the scanning functionality of the hand held device. This eliminates erroneous typing and user frustration.

Figure 5:
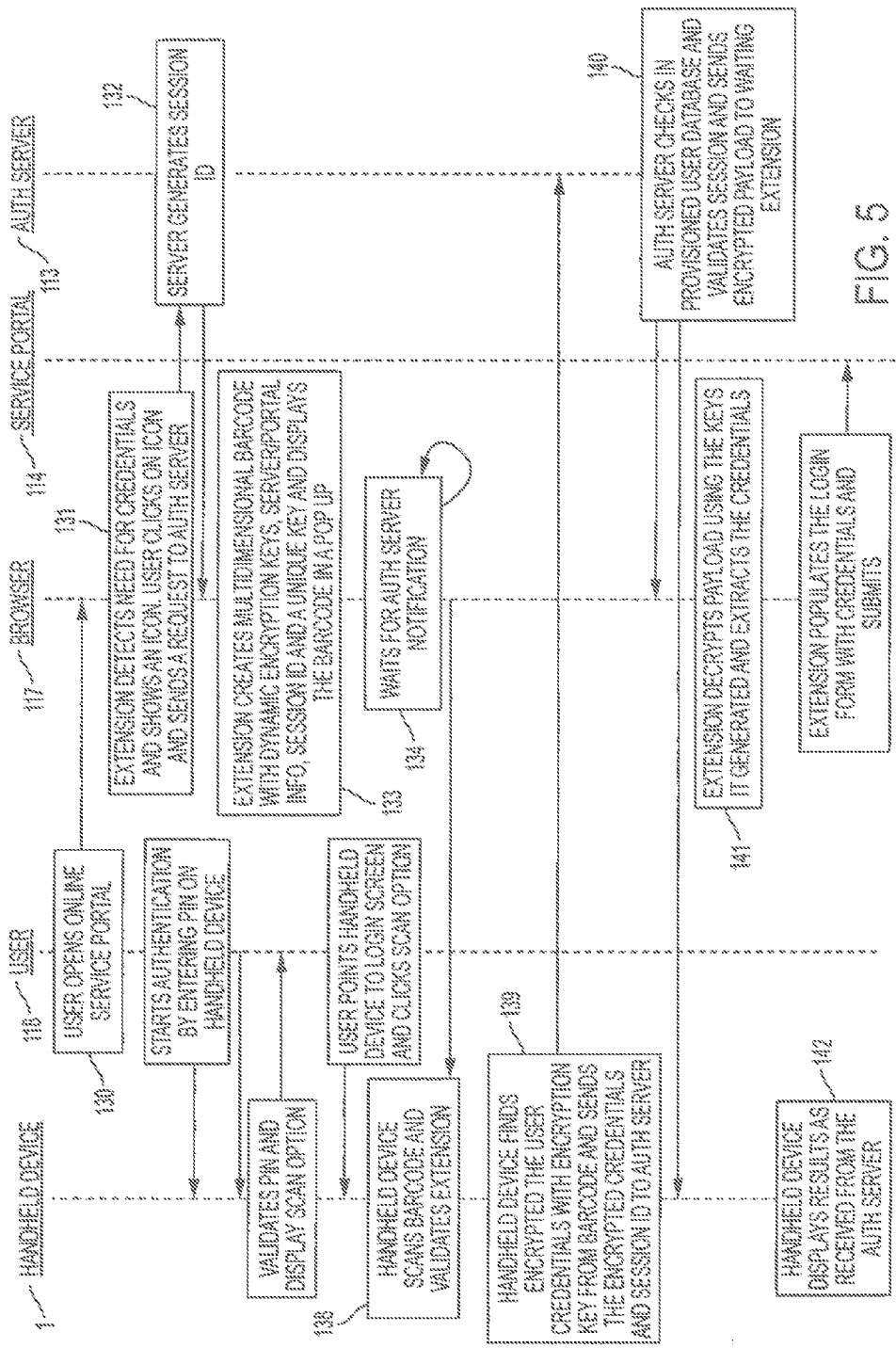
FIG. 5 is a sequence diagram describing the authentication flow based on an embodiment of a method and/or process based on the invention.

FIG. 5 shows a high level, less detailed and alternative embodiment of a method according to the invention shown in FIG. 4. A further embodiment, includes one or more variation of the methods and steps described above, and can include one or more of the following.

A method for authentication typically resides in a system comprising a user, a browser extension or plugin, a portable communications device, and an authentication server having a provisioned user database and encrypted payload.

The method can begin by detecting user intent to login to an online portal (like, gmail, yahoo, ebay, etc) using a browser; and then establishing contact between browser extension or plugin and authentication server wherein a new authentication session, is started.

Thereafter, a session ID can be generated at the authentication server, wherein the session ID is communicated to the browser plugin through at least a first communications channel.

A multi-dimensional barcode can be created at the browser extension or plugin, wherein the barcode has dynamic encryption keys, portal information, session ID, and a unique key, and wherein the barcode is displayed in the browser.

In one embodiment, the browser can be held in a waiting state pending authentication server notification of session validation, whereupon once positive notification is received starting authentication by user entering credential on portable communications device, wherein portable communications device validates credential and displays one or more scan options.

In one embodiment, a portable communications device can be used to scan the barcode displayed at login screen and validate browser extension or plugin. However other techniques of coded transmission including but not limited to NFC, RFID and Bluetooth, can be used within the scope of the invention.

Once the encrypted user credentials are located on the portable communications device with encryption key from barcode (or an alternative technique of transmission), the encrypted credentials are sent with the session ID from portable communications device to authentication server via an outbound out-of-band communications channel.

Then, a matching of information is checked in the provisioned user database of authentication server, and the session is validated. Once validated, the encrypted payload is sent to waiting the browser extension or plugin, and validation result can be sent from the authentication server to the portable communication device where the result can be displayed.

The payload can be decrypted at the browser extension or plugin using encryption keys; and credentials can be extracted and decrypted at the browser extension as well.

Using decrypted credentials the login form on the login page of the online portal in the browser can be populated or transmitted directly to initiate and/or complete the login requirements of the online portal, such as by sending the login form to the online portal using the browser extension or plugin.

Similarly, as shown in FIGS. 4, 5 and 6, a method according to the Invention can include a number of steps. One possible variation of a method according to the invention is set forth as follows. A user 113 interacts 130 with a client processing application 117.

The client processing application 117 contacts 131 and authorization server 113 to start a new session. The authorization server 113 starts a new session and generates 132 a session ID.

The authorization server 113 communicates with the secure client processing 117 and provides information, including among other things session ID information.

The client processing application 117 creates 133 a multi-dimensional barcode with barcode information, including dynamic encryption keys, server/portal information, session ID and a unique key. The client processing application can display the generated barcode.

The client processing application and then waits 134 for receipt of a notification from the authorization server to proceed.

The barcode that has been generated by the client processing application 117 is displayed by the application. The user 118 can scan the barcode with the handheld device 1. The handheld device scans the barcode and validates 138 the service server.

The handheld device finds 133 encrypted the user credentials with encryption key from the barcode and sends validation information including the encrypted credentials and the session ID to the authentication server.

The authorization server receives the validation information, including the encrypted credentials and the session ID and checks 140 the provisioned user database and validates and sends encrypted payload to the waiting client processing application as notification.

The client processing application 117 decrypts 141 the payload from the authorization server using the keys it generated and extracts the credentials. The client processing application then uses the decrypted credentials to provide access to the login portal of the online account or service.

Accordingly, the handheld device can also display and/or access 142 the online account or service. In addition, the handheld device then displays 142 the results which it receives from the authorization server.

Figure 7:
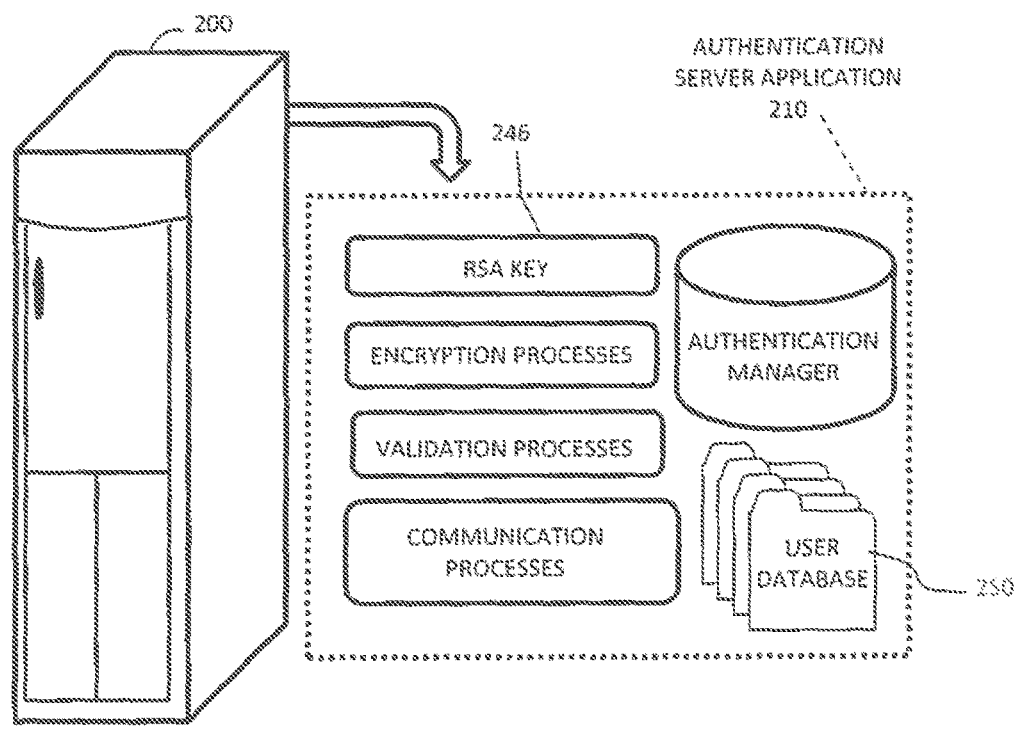
FIG. 7 is a block diagram depicting an embodiment of an authentication server.

FIG. 7 illustrates an embodiment of the authentication server 200 comprising of an authentication server application 210. The authentication server application comprises of a user database 250 and a RSA Key 246. The authentication server can be adapted to begin a new authentication system and generate a session ID. The authentication server can also be adapted to receive encrypted credentials, process the encrypted credentials, and send an encrypted payload to the client processing application. The authentication server can also be adapted to transmit and/or store encrypted credential for purposes of credential distribution and control. It can be appreciated by a person of ordinary skill in the art that the server can be provided as a general purpose computer or designed with the use of Application Specific Integrated Circuits (ASICS).

The user database 250 can be adapted to store previous user information, current user information, previous user interaction with the authentication server 200, unencrypted and encrypted credentials, public and private keys, device ID, Session ID, PIN, device RSA key 246, current user Interaction with the authentication server 200, among other things. The Authentication server application includes processes for encryption, validation, and communication allowing the server 200 to validate a new session with an incoming validation request. The authentication server application also Includes processes for managing the distribution of credentials between instances of the online application 280 and managing and enforcing user permissions for those credentials, as well as tracking the use of those credentials. The components and arrangements of FIG. 7 may be varied within the authentication server.

Figure 8:
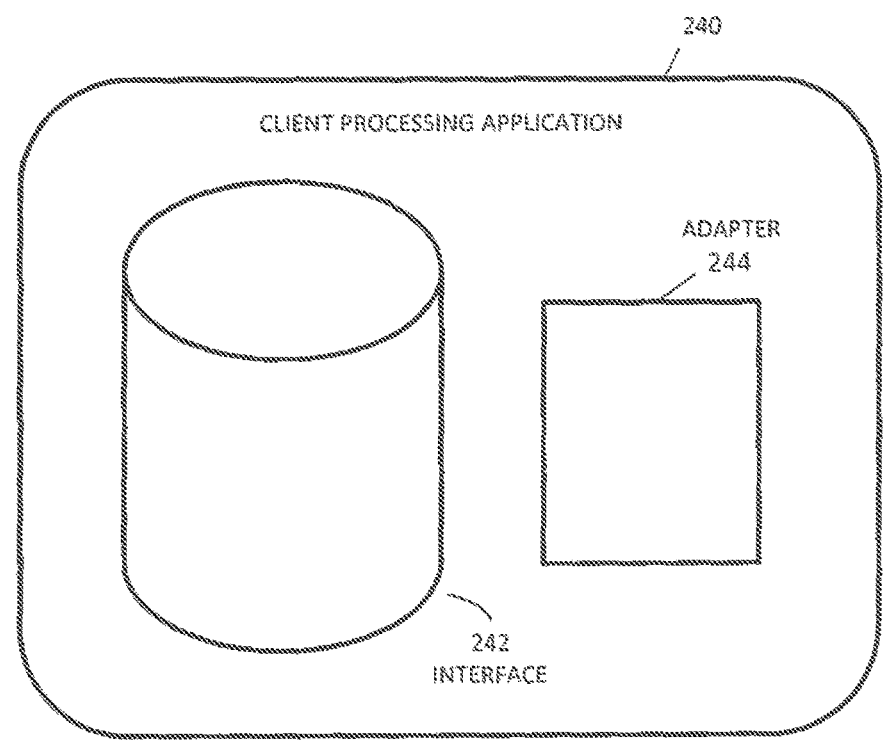
FIG. 8 is a schematic block diagram, of an embodiment of a client processing application.

FIG. 8 illustrates an embodiment of a client processing application 240 comprising of an interface 242, such as the Multi-dimensional QR Code, Bluetooth, NFC, or Computer generated Sound, which can be adapted for various types of devices, such as a handheld communication device or a desktop computer, and an adapter 244 that can also be embedded in other applications to adapt various types of online portals.

The interface 242 allows the user to interact with the client processing application 240 to begin the process of authenticating an online portal or payload. The interface is also adapted to allow the user to interact with the authentication server 200 during the authentication process, as well as provide use of the adapter 244. A typical embodiment might be a software library including components such as a QR code generator and public/private key encryption. It can be appreciated by a person of the ordinary skill in the art that the interface can be provided by different operating systems and interact with other processes within the client processing application 240.

The adapter 244 is provided within the client processing application 240 as additional programming to permit a user to access various online portals encrypted by the system. Accordingly, it can be appreciated by a person of ordinary skill in the art that such software can be pre-installed or installed upon use.

Various changes may be made to the system and process embodying the principles of the invention. The foregoing embodiments are set forth in an Illustrative and not in a limiting sense. The scope of the invention is defined by the claims appended hereto.

I claim:

1. A system of user authentication for accessing an online portal in a communications network, the system comprising:
    a client processing application having programming for communication with a login portal and screen for access by a user;
    a hardware authentication server device having programming for establishing contact between the client processing application and the hardware authentication server device wherein a new authentication session is started; programming for generating a session identification ("ID"), and programming for communicating a session ID to the client processing application through at least a first communications channel;
    wherein the client processing application includes programming for creating a multi-dimensional barcode for display at the login screen, wherein the multi-dimensional barcode has dynamic encryption keys, portal information, session ID, and a unique key; and programming for holding the client processing application in waiting pending notification of session validation by the hardware authentication server device;
    wherein the client processing application includes programming for authentication by receiving user credentials from a portable communications device,
    a portable communications device application having programming for authentication; including programming for receiving user credentials and displaying at least one scan option; programming for scanning the multi-dimensional barcode displayed at the login screen; programming for validating the client processing application; programming for finding at least one encrypted user credential with the encryption key from the multi-dimensional barcode; and programming for sending the at least one encrypted user credential and session ID to the hardware authentication server device via an outbound out-of-band communications channel;
    wherein the hardware authentication server device further includes programming for checking a provisioned user database and validating the session ID; programming for sending an encrypted payload to the waiting client processing application; programming for sending validation result to the portable communication device where the result can be displayed;
    wherein the client processing application includes programming for extracting and decrypting the at least one encrypted user credential; and programming for using an at least one decrypted user credential to access the online portal.

2. A system according to claim 1, wherein the client processing application further includes programming to create a multi-dimensional barcode from a QR code in the encrypted payload.

3. A system according to claim 1 wherein the client processing application further includes programming to send the encrypted credentials and session ID to the authentication server via an outbound out-of-band communications channel.

4. A system according to claim 1 wherein the browser extension further includes programming to send the encrypted credentials and session ID via an outbound out-of-band communications channel to the authentication server.

5. A system according to claim 1 wherein the client processing application further includes processing to create an RSA key.

6. A method for authentication for accessing an online portal in a system comprising a user, a client processing application, a portable communications device, and an authentication server having a provisioned user database and encrypted payload, wherein the method comprises:
    providing a login portal and screen for access by a user, said login portal being in communication with said client processing application;
    establishing contact between the client processing application and the authentication server wherein a new authentication session is started;
    generating a session identification ("ID") at the client processing application;

creating a multi-dimensional barcode at the client processing application, wherein the multi-dimensional barcode has dynamic encryption keys, portal information, session ID, and a unique key, and wherein the multi-dimensional barcode is displayed at the login screen;

holding the client processing application in waiting pending the authentication server notification of session validation;

starting authentication by user entering credentials on the portable communications device, wherein the portable communications device validates the credentials and displays scan option;

using the portable communications device to scan the multi-dimensional barcode displayed at the login screen and validate the client processing application;

finding on the portable communications device at least one encrypted user credential with an encryption key from the multi-dimensional barcode;

sending the at least one encrypted user credentials and session ID from the portable communications device to the authentication server via an outbound out-of-band communications channel;

checking in provisioned user database of the authentication server, wherein the new authentication session is validated;

sending an encrypted payload to waiting at the client processing application;

sending validation result from the authentication server to the portable communication device where the result is displayed;

decrypting the encrypted payload at the client processing application using the dynamic encryption keys;

extracting and decrypting the at least one encrypted user credential at the client processing application; and using an at least one decrypted user credential to access the online portal.

7. A method according to claim 6 wherein the step of creating a multidimensional barcode includes the client processing application creating a QR code from the encrypted payload.

8. A method according to claim 6 wherein the step of sending the at least one encrypted user credential and session ID from the portable communications device to the authentication server via an outbound out-of-band communications channel is performed by the client processing application.

9. A method according to claim 6 wherein the step of sending the encrypted credentials and session ID to the authentication server via an outbound out-of-band communications channel is performed by the browser extension.

10. A method according to claim 6 wherein the client processing application creates an RSA key.

* * * * *